Sept. 14, 1965             P. COHEN             3,206,104
SELF-STICK CARRYING HANDLE
Filed July 28, 1964
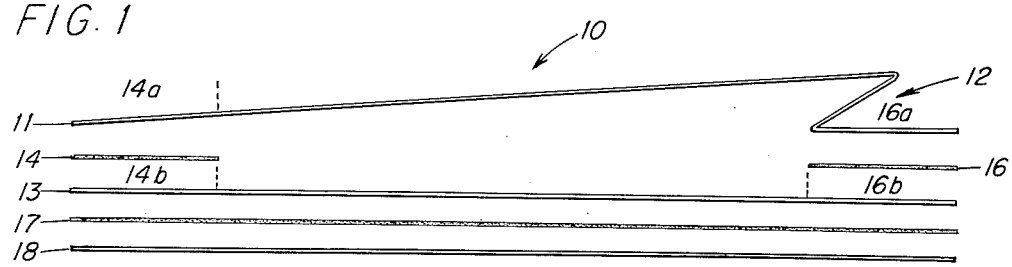
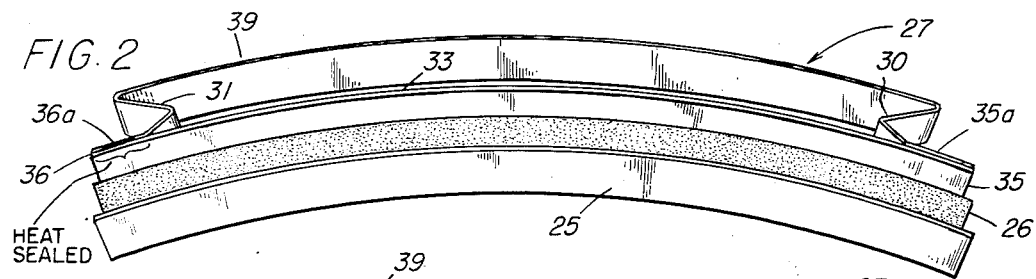
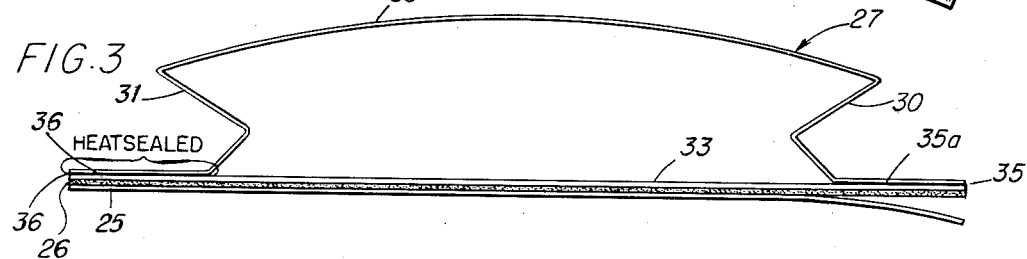
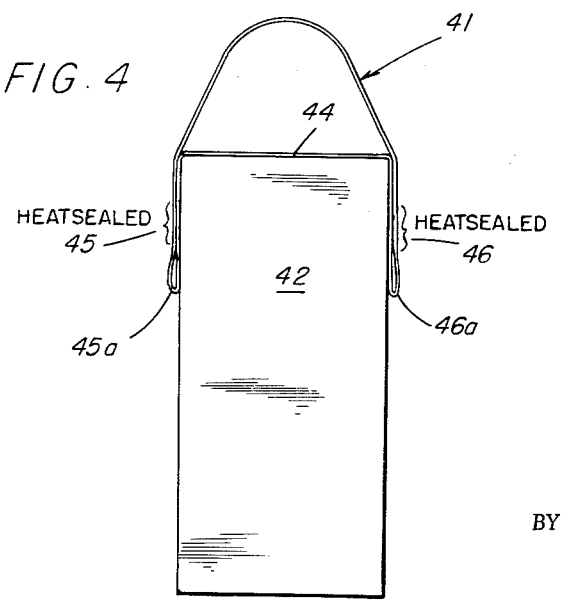
INVENTOR.
Paul Cohen
BY Michael Dofney
Attorney

United States Patent Office 3,206,104
Patented Sept. 14, 1965

3,206,104
SELF-STICK CARRYING HANDLE
Paul Cohen, Harrison, N.Y., assignor to Technical Tape Corp., New Rochelle, N.Y., a corporation of New York
Filed July 28, 1964, Ser. No. 385,721
7 Claims. (Cl. 229—52)

This invention relates to a carrying handle for packages, parcels, articles and the like.

An object of this invention is a self-stick carrying handle capable of being adhered to articles, packages, parcels and the like.

Another object of the invention is an easily produced self-stick carrying handle of the aforesaid type.

A particular object of the invention is a plastic film carrying handle of the aforesaid type utilizing a pressure sensitive adhesive for adhesion to the item to be carried.

Other objects of the invention will become apparent in the course of the detailed description of the invention.

The carrying handle of the invention comprises: A strip of strong sheet material with pressure sensitive adhesive coated on one side, which adhesive is covered by a stripable release sheet. Positioned next to the adhesive-free side of the aforesaid strip is a handle engageable strip of strong sheet material which hand strip is adhered, adjacent each end of the coated strip, to a significant length of the adhesive-free side of the coated strip. Preferably, the strong strip for coating, the hand engageable strip and the adhering portions form a band of tubular heat sealable plastic film, such as polyethylene or polyvinyl chloride.

The invention is described in connection with the figures which form a part of this specification.

FIGURE 1 shows one embodiment of the carrying handle of the invention.

FIGURE 2 shows an exploded view of a carrying handle formed from a band of tubular plastic film.

FIGURE 3 shows the handle of FIG. 2 with the release sheet partially disengaged.

FIGURE 4 shows still another embodiment (similar to FIG. 2) of the carrying handle of the invention adhered to a package.

In FIGURE 1 the carrying handle 10 comprises a hand engageable strip 11 made of strong sheet material. Here, hand strip 11 is provided with a gusset 12 which permits strip 11 to be folded flat for storage. Strip 13 is formed of strong sheet material and is of a length and width such that the area of contact with the package will enable the carrying handle to do the job. Preferably, hand strip 11 and strip 13 are of the same width.

Strips 11 and 13 are in adhering contact for a significant length, adjacent to each end of the strip 11; herein the contact is made by way of adhesive layers 14 and 16, the corresponding lengths of strip 11, namely, 14a and 16a, and the corresponding lengths of strip 13, namely, 14b and 16b.

It is to be understood that "significant length" means an adhered area sufficient to permit carrying of a package of the weight normally intended to be carried by means of the particular carrying handle. Thus, "significant length" is dependent upon the width of the strips 11 and 13, and the type of sheet material forming these strips; the type of adhesive used at 14 and 16; the type of adhesive 17 applied to strip 13; and also the type of surface to which the handle is adhered by means of pressure sensitive adhesive layer 17.

Pressure sensitive adhesive coating (layer) 17 is applied to the underside—in this view of FIGURE 1—of strip 13. A strippable release sheet 18 formed of material which can be easily stripped from contact with pressure sensitive adhesive coating 17 is adhered to adhesive 17 and covers the entire pressure sensitive adhesive coating 17. Strippable release sheet 18 may be glazed paper, waxed cloth or paper, varnished cloth or paper, or a plastic film. It is to be understood that release sheet 18 may be any material which can be stripped from the pressure sensitive adhesive coating 17 without damage thereto.

The strong sheet material which forms sheets 11 and 13 may be plastic film, paper, cloth, especially non-woven cloth, and the like. For a carrying handle of the type shown in FIGURE 1, it is preferred that strip 11 be formed of non-woven cloth and strip 13 be formed of kraft paper.

The adhesive of strips 11 and 13 in this embodiment of FIGURE 1 may be a permanent type of adhesive, such as a glue or a hot melt adhesive. When sheets 11 and 13 are of plastic film, they may be heat sealed together.

Pressure sensitive adhesive coating 17 may utilize any of these adhesives known to the art. The particular type of adhesive will be determined by the service for which the carrying handle is intended, and also by the type of material forming strip 13, and also the surface to which the carrying handle 10 is to be adhered.

FIGURES 2 and 3 show another embodiment of the carrying handle of this invention. FIGURE 2 is an exploded view showing release paper 25, pressure sensitive adhesive coating 26 and band 27. Band 27 is a tubular heat sealable plastic film made from extruded gusseted film in one piece, i.e., no seams; the extra length needed for the handle portion comes from the gussets 30 and 31—only one gusset may be present in some embodiments. Band 27 is arranged to provide an arc 33 of substantial length, which is coated on its underside with pressure sensitive adhesive 26. The length of arc 33 (also spoken of as "strip 33") is determined by the needed carrying capacity of the handle.

Adjacent each end 35 and 36 of strip 33, a significant length 35a and 36a of band 27 is brought into heat sealed contact with the top of strip 33. The length of band 35a and 36a which is in heat sealed contact with strip 33 is determined by the characteristics of the plastic forming band 27, and also the capacity requirements of the carrying handle. In FIGURES 2 and 3 the heat sealed contact is shown as including the very ends 35 and 36. However, this is not necessary in all cases. (Note FIG. 4.) Because pressure sensitive adhesive is generally of relatively poor peel strength, it is essential that the heat sealed contact area defined in 35a and 36a sohuld be of such a length that the pull of the carrying handle will not be concentrated at the ends 35 and 36.

Handle portion 39 comprises the remaining arcuate portion of tubular band 27, i.e., the circumference of band 27 less the length of strip 33 and the adhered lengths 35a and 36a.

FIGURE 3 shows the carrying handle of FIGURE 2 with release sheet 25 partially disengaged near end 35.

FIGURE 4 shows a carrying handle 41 adhered to package 42. Here the pressure sensitive adhesive coated strip 44 passes across the top surface and partially down the sides of package 42. In this embodiment the heat sealed contact areas 45 and 46 do not extend to ends 45a and 46a of the strip 44.

Preferred plastics for use in the carrying handle of FIGURES 2–4 are polyethylene, polypropylene, polyvinyl chloride, polyvinyl acetate, and also co-polymers made from the monomers corresponding to the enumerated polymers, for example, ethylene-vinyl acetate co-polymer. For some uses, cellulose esters such as, cellulose acetate butyrate are desirable sheet materials for carrying handles.

It can be seen that the carrying handles of the invention are adapted to be made in unitary form and packed in a box or other dispenser for withdrawl one at a time. However, the carrying handles may be wound into a roll, by means of a common long release sheet, and dispensed through an ordinary gummed paper dispenser, discharging one carrying handle at a time.

It is to be understood that the above description does not limit the scope of the invention. It is self evident that many other embodiments and variations not mentioned herein can be readily devised by those of ordinary skill in this art, after having become cognizant of the aforesaid description.

Thus having described the invention what is claimed is:

1. A carrying handle adapted for self-stick application to a package and the like, which handle consists of:
   (a) a package contact strip of strong sheet material;
   (b) a hand engageable strip of strong sheet material, of essentially the same width as said contact strip;
   (c) said hand strip and said contact strip being adhered to each other for a significant length of said contact strip, adjacent to each end of one side of said contact strip;
   (d) a pressure sensitive adhesive coating on the entire other side of said contact strip; and
   (e) a strippable release sheet adhered to said coating.

2. A carrying handle adapted for self-stick application to a package and the like, which handle consists of:
   (i) a package contact strip of strong non-woven cloth;
   (ii) a hand engageable strip of strong non-woven cloth, having the same width as said contact strip;
   (iii) the ends of said hand strip extending essentially to the ends of one side of said contact strip;
   (iv) said hand strip and said contact strip being permanently adhered to each other for a significant length of said contact strip, adjacent to each end of said one side of said contact strip;
   (v) a pressure sensitive adhesive coating on the entire other side of said contact strip; and
   (vi) a strippable release sheet adhered to said coating.

3. A carrying handle adapted for self-stick application to a package or the like, which handle consists of:
   (1) a tubular band of heat sealable plastic film;
   (2) a pressure sensitive adhesive coating on a substantial length of the outer surface of said band, forming a package contacting strip;
   (3) a strippable release sheet adhered to said pressure sensitive adhesive;
   (4) a significant length of said band, adjacent to each end of said contact strip, in heat sealed contact with the inner side of said band; and
   (5) a handle consisting of the remaining arcuate portion of said band.

4. A carrying handle in accordance with claim 3 wherein said band includes two gussets in opposed relation.

5. A carrying handle in accordance with claim 3 wherein said plastic is selected from the class consisting of polyethylene, polypropylene, polyvinyl chloride, polyvinyl acetate and copolymers of the corresponding monomers.

6. A carrying handle in accordance with claim 3 wherein said plastic comprises polyethylene.

7. A carrying handle in accordance with claim 3 wherein said plastic comprises polyvinyl chloride.

References Cited by the Examiner
UNITED STATES PATENTS

| | | | |
|---|---|---|---|
| 2,158,697 | 5/39 | Harrison | 229—52 |
| 2,374,645 | 5/45 | Borbe | 229—52 |
| 2,773,635 | 12/56 | Stelzer | 229—52 |
| 2,985,464 | 5/61 | McFarland | 229—92.3 |
| 3,065,845 | 11/62 | Nichols | 229—52 |

JOSEPH F. LECLAIR, *Primary Examiner.*

FRANKLIN T. GARRETT, *Examiner.*